UNITED STATES PATENT OFFICE.

CHARLES B. JACOBS, OF EAST ORANGE, NEW JERSEY, ASSIGNOR TO THE AMPERE ELECTRO-CHEMICAL COMPANY, OF AMPERE, NEW JERSEY.

COMPOUND OF SILICON AND HYDROGEN.

SPECIFICATION forming part of Letters Patent No. 656,354, dated August 21, 1900.

Application filed January 12, 1900. Serial No. 1,180. (No specimens.)

*To all whom it may concern:*

Be it known that I, CHARLES B. JACOBS, a citizen of the United States, residing at East Orange, in the county of Essex and State of New Jersey, have discovered a certain new and useful Compound of Silicon and Hydrogen, of which the following is a specification.

This discovery relates to a new chemical product consisting of silicon and hydrogen combined in equal molecular proportions, according to the formula $Si_2H_2$, and which, by analogy to the corresponding carbon compound, I term "silico-acetylene."

The above-named compound results from the treatment of calcium silicide with dilute acids, particularly with hydrochloric acid, according to the following equation:

$$CaSi_2 + 2HCl = CaCl_2 + Si_2H_2.$$

Strontium silicide also yields it, but in smaller quantity and in a state of finer division than calcium silicide. The equation for the strontium compound is similar to that for calcium. Silico-acetylene is a yellow crystalline compound having the formula $Si_2H_2$, and therefore bears the same relation to silico-methane ($SiH_4$) as acetylene ($C_2H_2$) bears to methane, ($CH_4$;) hence the name above applied to it.

The compound $Si_2H_2$ differs in properties from the compound $Si_2H_3$, which Ogier obtained by sparking $SiH_4$, which was unstable and exploded when subjected to a shock, $Si_2H_2$ being stable or non-explosive at ordinary temperatures. When treated with twenty per cent. solution of caustic soda or potash, ($Si_2H_2$,) it yields hydrogen according to the following equation:

$$Si_2H_2 + 4NaOH + 2H_2O = 2Na_2SiO_3 + 10H.$$

Heated in air this compound $Si_2H_2$ oxidizes rapidly, giving $2SiO_2 + H_2O$, and when heated in a closed tube it breaks down into amorphous silicon and free hydrogen.

Having thus described my invention, what I claim as new therein, and desire to secure by Letters Patent, is—

The compound consisting of silicon and hydrogen, combined in equal molecular proportions, the same being a yellow crystalline non-explosive compound, insoluble in water and in acids, and soluble in caustic alkali solutions.

CHARLES B. JACOBS.

Witnesses:
J. GREEN,
A. P. KNIGHT.